United States Patent Office 3,597,179
Patented Aug. 3, 1971

3,597,179
GLASS TREATMENT AND GLASS-CERAMIC
ARTICLE THEREFROM
George A. Simmons, Toledo, Ohio, assignor to
Owens-Illinois, Inc.
No Drawing. Filed Mar. 30, 1967, Ser. No. 626,940
Int. Cl. C03c 21/00
U.S. Cl. 65—30
13 Claims

ABSTRACT OF THE DISCLOSURE

A process of treating an article of glass to provide a glass-ceramic having a high flexural strength which comprises heat treating an article of glass at elevated temperatures, including a nucleation temperature and a subsequent higher temperature that is a maximum of 1650° F. for periods of time sufficient to provide a glass-ceramic article with a compressive layer, followed by a treatment of the article of glass-ceramic with an ion-exchange medium containing a salt of an alkali metal other than lithium at an elevated temperature of at least 200° C. and for a period of time to exchange alkali metal ions of the salt with lithium ions in the glass-ceramic surface, with the elevated temperature being below that at which the compressive stress created by the ion-exchange is relieved, and the article of glass-ceramic resulting from said process.

E. B. Shand in his book entitled "Glass Engineering Handbook," second edition, published in 1958 by McGraw-Hill Book Company, Inc., New York, N.Y., states on page 3 that glass has been defined as an inorganic product of fusion which has been cooled to a rigid condition without crystallization. He further states that this definition emphasizes the point that glasses are non-crystalline, i.e., amorphous. P. W. McMillan in the preface to his book entitled "Glass-Ceramics," U.S. edition, published in 1964 by Academic Press Inc., New York, N.Y., states that glass-ceramics are materials that are made by the controlled crystallization of glasses. Some inorganic glasses are not controllably crystallizable, and as a result they devitrify as the term is normally used. Those glasses that are controllably crystallizable by a heat treatment are commonly referred to as thermally crystallizable glass compositions. The glass-ceramics are the products obtained from these controllably crystallizable inorganic glasses by a suitable heat treatment, and glass-ceramics are also referred to as thermally crystallized glasses.

There are many types of silicate glasses that are thermally crystallizable glass compositions. A glass-ceramic body contains many small crystals in a glass matrix. The crystalline phase of glass-ceramics can contain one or more crystalline materials. The crystalline materials that are formed depend upon the original composition of the thermally crystallizable glass and often depend upon the nature of the heat treatment.

U.S. patent application Ser. No. 352,958 filed on Mar. 18, 1964, by William E. Smith, with common assignee, and entitled "Glasses, Ceramics and Method," now Pat. No. 3,380,818, relates to thermally crystallizable glasses comprising $SiO_2$, $Al_2O_3$, $Li_2O$, MgO and limited amounts of both $ZrO_2$ and $TiO_2$. That U.S. patent application states that in the preparation of glass-ceramics, titanium dioxide is a known agent for promoting the in situ formation of many fine crystals, by heat treatment of base glasses rich in magnesium and aluminum and containing calcium, expressed as oxides, and less than 50% silica, by a two-stage nucleation and crystallization heat treatment. In these products the main crystalline forms are those of the augite group.

Titania has also been used as a nucleant to make glass-ceramics from glass whose composition is such that the main or predominant crystalline form which results is beta-spodumene, or some form of crystalline material similar to beta-spodumene, as shown by X-ray diffraction. However, as seen in British Pat. No. 857,367, in order to get adequate crystallization it has been found necessary to employ at least, usually more than, 3 weight percent of titanium dioxide. The use of such appreciable amounts of relatively expensive titanium dioxide in glass compositions has several technical disadvantages. Such glass-ceramics containing on a weight basis about 60–75% $SiO_2$, 15–25% $Al_2O_3$, 2–6% $Li_2O$ and over 3% $TiO_2$ have disadvantages that are pointed out in that Smith patent application which discloses and claims as the invention glass-ceramics formed by treatment of new glass compositions utilizing in situ crystallization.

These glasses of Smith contain at least the following essential components on a weight basis, in the percentage limits based on the total composition:

| | |
|---|---|
| $SiO_2$ | 66–73 |
| $Al_2O_3$ | 15–19 |
| $Li_2O$ | 2.5–4 |
| MgO | 3–7.7 |
| $ZrO_2$ | 1–1.7 |
| $TiO_2$ | 1–<2.4 |

In addition, other useful and purposely added components of these glasses include $SnO_2$ up to 1.7, $P_2O_5$ up to 3 (usually 0–2), BaO up to 5, and ZnO up to 3, all in weight percent of the glass composition. Further, small amounts of residual arsenic oxide and/or antimony oxide are often present in the compositions, because arsenic and antimony compounds are often used as fining agents. In actual practice, arsenic, expressed as $As_2O_3$, is usually present in amounts not more than 0.3 weight percent, and antimony, expressed as $Sb_2O_5$, is seldom present in amounts over 1 weight percent. Also $Na_2O$, while not particularly desirable, is often present to a certain degree as an impurity, usually in an amount that is not over 1.5 weight percent. Further, when $As_2O_3$ is used as a finding agent, it is commonly added together with a little $NaNO_3$, a well-known practice. Another additive sometimes employed is F, usually in amounts not exceeding 0.4 weight percent. It is, of course, added as a salt in the usual manner, and seems to aid somewhat the crystallization process when it is employed.

That patent application of William E. Smith discloses numerous examples of such glass compositions that are converted to glass-ceramic by suitable heat treatments that are described in detail. The examples in Table III of the Smith patent application show heat treatments for a large number of these glass compositions. The maximum temperature reached in the heat treatment schedule is between 1800° F. and 2000° F. The average coefficients of linear thermal expansion shown in Table III for these glass-ceramics were between about $11 \times 10^{-7}/°$ C. and about $21 \times 10^{-7}/°$ C. over the temperature range indicated in the table.

U.S. Pat. No. 2,920,971 of S. D. Stookey discloses a number of different types of glass compositions that produce different types of glass-ceramics in which the crystalline phase of a particular type of glass-ceramic contains one or more different crystalline materials. The data presented in that patent show that the glass-ceramics obtained have widely different thermal coefficients of linear expansion. Some of the glass-ceramics have coefficients that are as low as about $12 \times 10^{-7}/°$ C. and others have coefficients that are as high as about $190 \times 10^{-7}/°$ C. Some of the glass-ceramics have higher coefficients of linear thermal expansion than the glass used to make them. Others are lower than the thermally crystallizable glasses from which they are made.

Table II of U.S. Pat. No. 2,920,971 presents glass compositions which are thermally crystallizable and which contain at least 3% by weight of $Li_2O$. Three of the compositions provide glass-ceramics that have coefficients of linear thermal expansion between about $10 \times 10^{-7}/°$ C. and about $22 \times 10^{-7}/°$ C. These compositions do not contain either MgO or CaO. They contain a high weight percent of $TiO_2$ and a relatively high weight percent of $Li_2O$. Other glass compositions in this Table II contain MgO and CaO but they contain at least 7% by weight of $TiO_2$. Most contain 13.7% or 13.8% by weight of $TiO_2$. The glass-ceramic obtained from only one of these latter glasses has an indicated expansion coefficient. It is shown to be about $64 \times 10^{-7}/°$ C. In that composition the $Li_2O$ content is 3.1% by weight and the $TiO_2$ content is 13.8% by weight. Glasses 2 and 3 of Table II of U.S. Pat. No. 2,920,971 are indicated by Table XV as containing spodumene and rutile as the crystalline phases with spodumene being the predominant phase.

The Smith patent application Ser. No. 352,958, now Pat. No. 3,380,818, describes the manner of heat treatment to convert its crystallizable glass composition to glass-ceramic. The maximum temperature reached in the suggested heat treatment ranges from about 1400° F. to 2100° F. and the period of time at the final temperature used is dependent upon the glass composition and upon the actual maximum temperature. When the maximum temperature is limited to the range of about 1400° F. to about 1675° F., a main crystalline phase that is formed is beta-eucryptite or a beta-eucryptite-like phase. As the final or maximum temperature of the heat treatment is increased above about 1650° F. one can obtain mixtures of beta-eucryptite-like crystals and beta-spodumene-like crystals. At the maximum heat treatment temperatures of about 1800° F. to 2100° F. one can obtain as a main crystalline phase beta-spodumene or beta-spodumene-like crystalline phases.

The glass-ceramic of that patent application has an expansion coefficient that is dependent upon the final temperature of the heat treatment, as well as on the time of heat treatment. When the glass-ceramic results from a final heat treatment temperature of a maximum of about 1650° F. to 1675° F., the expansion coefficient is substantially lower than when a substantially higher final temperature for the heat treatment is used, when essentially equal heat treatment times are used. This is probably because a beta-eucryptite-like phase has a lower expansion coefficient than a beta-spodumene-like phase.

In the foregoing discussion of glass-ceramics, attention is primarily directed to those glass-ceramics that contain either a beta-eucryptite or beta-eucryptite-like phase or a beta-spodumene or beta-spodumene-like phase, or a mixture of such crystalline phases. In such glass-ceramics and the thermally crystallizable glasses used to provide such thermally crystallized glasses, the participating alkali metal ions are lithium ions. Lithium ion has the smallest ionic radius of all of the alkali metal ions. The size of the ionic radius of alkali metal ions increases with the increase of atomic number. Thus sodium ions are larger than lithium ions but are smaller than potassium ions.

Glass is strengthened by ion exchange, as described by M. E. Nordberg et al. in their article entitled "Strengthening by Ion Exchange" published in the Journal of the American Ceramic Society, vol. 47 (May 1964), beginning at page 215. Some glass-ceramics, that contain exchangeable alkali metal ions, have been improved in strength by ion-exchange treatment at an elevated temperature. The usual process of such ion exchange is an immersion of the glass or glass-ceramic in a molten bath of alkali metal inorganic salt or a mixture of such salt with other inorganic salts at an elevated temperature. During such treatment, there is an exchange of alkali metal ions in the surface portion of the glass-ceramic with alkali metal ions of inorganic salt present in the molten salt. The time of immersion is sufficient to cause this exchange only in a surface layer of the article. Lithium ions in a glass or bulk crystallized glass-ceramic have been exchange with sodium and potassium ions in molten inorganic salts.

When a larger alkali metal ion replaces a smaller alkali metal ion in the surface layer of glass at a temperature that is below the strain point of the glass, the surface layer then has a compressional or compressive stress. Apparently the larger ions try to occupy the smaller spaces previously occupied by the smaller alkali metal ions, thereby creating the compressional stress in the surface layer. Because the temperature of the glass is below the strain point, the glass structure cannot readjust itself to relieve the stress. A tensile stress is created in the main body portion of the glass article.

The flexural strength of at least some glass-ceramic articles can be increased by ion-exchange treatment. It has been found that for a particular compositional class of glass-ceramics, i.e., bulk crystallized articles obtained from a thermally crystallizable glass of a certain range of components, there can be obtained a very large increase in strength by replacing lithium ions in such glass-ceramic with an alkali metal ion of larger ionic radius, such as sodium and potassium ions, in a surface layer of the article. This strengthened glass-ceramic, i.e., bulk crystallized glass, and the method of making it are disclosed and claimed in U.S. patent application Ser. No. 362,481, filed on Apr. 24, 1964, by Robert R. Denman, with common assignee, and entitled "Ceramics and Method," now Pat. No. 3,428,513.

The composition of the thermally crystallizable glass used to make this glass-ceramic that is ion exchanged in the method of this Denman patent application, contains on a weight percent basis: $SiO_2$ 68–72, $Al_2O_3$ 16–18, $Li_2O$ 3–4, MgO 3–5, $ZrO_2$ 1–2, $TiO_2$ 1.2–2.4 and $P_2O_5$ 0.8–2. The glass-ceramic of the article, that is obtained from the thermally crystallizable glass by bulk crystallization, contains a multitude of in situ formed crystals homogeneously dispersed throughout said article, essentially all of which crystals are in their largest lineal dimension less than 25 microns across. This bulk crystallization includes heating the article for at least 15 minutes at a temperature of at least 1800° F. The glass-ceramic obtained has an average coefficient of linear thermal expansion that is less than $20 \times 10^{-7}/°$ C. over the range from 25 to 300° C.

This Denman patent application describes as one of the specific examples the bulk crystallization of rods of a specific thermally crystallizable glass in this compositional area using a particular heat treatment schedule in which the final maximum temperature was 1900° F. In the subsequent ion-exchange treatment of this Denman process, the glass-ceramic rods were immersed in a molten bath of sodium nitrate maintained at 750° F., some for one-half hour and others for three hours. The average flexural strengths of these glass-ceramic rods, that had been ion exchanged for one-half hour or for three hours were determined. The average flexural strength of some more of these glass-ceramic rods that were not ion exchanged was also determined. Before the flexural strength determinations some of each of these three groups of rods were abraded by tumbling for 15 minutes in a ball mill with No. 12 silicon carbide grit.

The untreated glass-ceramic rods had an average unabraded flexural strength of 23,800 p.s.i. while abraded rods of the untreated glass-ceramic had an average flexural strength of 16,900 p.s.i. The glass ceramic rods that were ion exchanged for one-half hour and three hours had average unabraded flexural strengths of 100,000 p.s.i. and 96,000 p.s.i., respectively, while the abraded strengths were 27,700 p.s.i. and 78,500 p.s.i. respectively. The ion-exchange treatment provided a compressive stress in a surface layer with a depth of 27 microns and 72 microns for the one-half-hour and three-hour treatments, respectively. The heat treatment schedule used for the bulk crystallization treatment was such that the glass-ceramic contained beta-spodumene or beta-spodumene-like crystals.

These high unabraded and abraded flexural strengths of ion-exchanged glass-ceramic that was made from thermally crystallizable glass of this compositional area were much greater than ion-exchanged glass-ceramic made from a thermally crystallizable glass having a composition outside of that compositional area. Rods of this other glass-ceramic had been bulk crystallized using a heat treatment that had about the same final maximum temperature. It was 1950° F. The three-hour ion-exchange treatment by immersion of the rods in sodium nitrate bath at 750° F. resulted in average unabraded and abraded flexural strengths of only 50,000 p.s.i. and 18,000 p.s.i., respectively.

The glass-ceramics utilized in the process disclosed and claimed in this Denman U.S. patent application Ser. No. 362,481, now Pat. No. 3,428,513, have compositions within the compositional area of glass-ceramics that are claimed as glass and glass-ceramic articles and the process of making them in the Smith U.S. patent application Ser. No. 352,958, now Pat. No. 3,380,818, mentioned above. That Smith patent application indicates that, when the bulk crystallization heat treatment of such thermally crystallizable glass is such that the highest temperature is in the range of about 1800° F. to 2100° F., one can obtain a glass-ceramic which has, as a main crystalline phase, a beta-spodumene or beta-spodumene-like crystalline phase.

When the thermally crystallizable glass having a composition utilized by the process of the Denman patent application is heat treated to a maximum temperature for bulk crystallization in which the main crystalline phase is beta-eucryptite or a beta-eucryptite-like crystalline phase, and the resulting glass-ceramic is then subjected to the ion-exchange treatment utilized by the examples in the Denman patent application, a high increase in the flexural strength was not obtained, as was shown by actual tests.

Thus, it can be seen that certain glass compositions, when converted into glass-ceramics and subsequently ion-exchanged as described, give significantly higher flexural strength, and better retention of this strength under abrasion, than other glass compositions which are superficially very similar. It can also be seen, as described, that the same thermally crystallizable glass, when given different heat treatments so as to yield glass-ceramics having two different crystalline phase compositions and/or proportions, can yield dramatically different strength increases upon being subjected to an ion-exchange treatment in the two different resulting glass-ceramic forms. However, to my knowledge, there is no precise way in which to predict whether a particular glass-ceramic can be strengthened by a molten salt bath treatment designed to effect ion exchange of alkali metal ions. Nor can the relative extent of strengthening which will be obtained, when different glass-ceramics are subjected to an ion-exchange treatment, be predicted. This invention relates to the discovery that an article made of certain thermally crystallized glasses (glass-ceramics) provide an article of unexpectedly high flexural strength upon being ion-exchange treated as described. The products have especially high flexural strength after severe abrasion.

U.S. patent application Ser. No. 410,016, filed on Nov. 9, 1964, now Pat. No. 3,291,412, by Richard W. Petticrew, with common assignee, and entitled "Glass Ceramic, and Method" describes a class of thermally crystallizable glass compositions and their use in the manufacture of glass-ceramics that are referred to as strong, partly crystalline ceramics. According to this Petticrew U.S. patent application, the composition of these thermally crystallizable glasses and the overall composition of the glass-ceramics that are obtained from it and that have a high flexural strength contain at least $SiO_2$, $Al_2O_3$, $Li_2O$, $CaO$, $MgO$, $TiO_2$ and $ZrO_2$. The sum of these named components constitutes at least 90% by weight of the composition. This composition contains on a weight percent basis, expressed as oxides, the following ingredients in the indicated range:

| | |
|---|---|
| $SiO_2$ | 60–74 |
| $Al_2O_3$ | 13–17 |
| MgO | 2–7 |
| CaO | 2–7 |
| $Li_2O$ | 1.5–2 |
| $TiO_2$ | 1–7 |
| $ZrO_2$ | 0–2 |
| $Na_2O$ | 0–6 |
| $K_2O$ | 0–4 |
| ($Li_2O+TiO_2$) | 3–9 |
| ($TiO_2+ZrO_2$) | 2–8 |
| ($Na_2O+K_2O$) | 2.5–6 |
| ($CaO+MgO$) | 6–13 |

Small amounts of other compatible glass-forming components, such as inorganic oxides and halides, can be included; e.g., up to about 3% BaO or SrO, up to about 4% $B_2O_3$ or $P_2O_5$, up to 1% ZnO or F (of course, F is present in combined form as a fluoride), and small amounts of colorants such as NiO and CoO, etc.

When these glasses are crystallized by thermal treatment, a multitude of crystals are formed in situ throughout the body, and these are embedded in the residual glassy matrix. These crystals make the body decidedly more refractory and resistant to thermal deformation. Such crystals are essentially all less than 30 microns across in their largest lineal dimension.

The crystallized body is exceptionally strong, having a high flexural strength. The lineal coefficient of thermal expansion of such bodies is greater than $30 \times 10^{-7}/°$ C. over the range from zero to 300° C. While the precise explanation for the high flexural strength is not known, it has been found that the bodies have a compressive layer on the surface. It is theorized that this layer has a higher proportion of low expansion lithium-containing crystals than the interior of the body, thus creating a compressive layer.

In any event, the lower limit of $Li_2O$ is about 1.5 weight percent of the glass and of the ceramic product made therefrom because, in general, a substantially lower amount results in decreased strength of the body, presumably because too little excess of lower expansion crystals are formed on the surface. On the other hand, when much over 2 percent $Li_2O$ is present the strength of the body is also lower, presumably because too many low expansion lithium-containing crystals are formed in the interior of the body, resulting in too low a coefficient of expansion of the overall body and, therefore, an insufficient differential in the thermal expansion coefficients of the surface and interior portions of the body or article.

The foregoing ranges, of various ingredients in the thermally crystallizable glasses and the glass-ceramics of the invention, that are disclosed and claimed in the Petticrew U.S. patent application Ser. No. 410,016, are illustrated by various examples of compositions presented in that patent application. These examples, as well as the entire disclosure of Serial No. 410,016 are incorporated herein by reference.

There are 13 glass and glass-ceramic compositions presented in Table I of this Petticrew patent application. In addition to the theoretical composition of these glasses along with certain physical characteristics, there are presented exemplary heat treatments at the temperatures and the hours stated. The table also presents the modulus of rupture of each glass-ceramic made by the indicated heat treatment. Before determination of the modulus of rupture the sample rods of glass-ceramics were abraded under mild standard conditions in the zone of the rods where there would be a maximum of bending stress in the flexural strength determination. This form of mild abrasion was provided by contacting the surface area in this zone of the rods with No. 320-grit abrasive cloth or paper while the individual sample rod was being rotated in a slowly moving chuck-drill press. Ordinarily, five sample rods were thus mildly abraded and then tested to obtain an average flexural strength value which was calculated and expressed in pounds per square inch (p.s.i). This mild abrasion of glass rods or glass-ceramic rods is utilized in the study of flexural strength of glasses and glass-ceramics, because the mild abrasion provides flexural strength values that can be compared with greater significance. The improvement in comparison is because such mild abrasion reduces the variation in the surface characteristics of different samples of rods of the same glass or glass-ceramic.

Most of the glass-ceramics that are shown in Table I of this Petticrew U.S. patent application present as their modulus of rupture the average numerical values of a number of rods tested. Only four of them are merely reported as having a strong modulus of rupture. Of those reported, the values of the modulus of rupture range from 33,000 p.s.i. up to 68,000 p.s.i.

In the process of the invention of the Petticrew U.S. patent application Ser. No. 410,016, an article of a glass of the class of glass compositions is formed by conventional means such as press molding, casting, blow molding and tube drawing. The formed glass article is cooled down to about its annealing point or lower and then is raised to an initial temperature within a temperature range at which the glass will form many nuclei or crystallites during the period that the glass is at this temperature. Thereafter the glass article is heated to a higher temperature to complete the crystallization to the desired degree. The optimum heat treatment schedule depends on the particular glass composition and its tendency to form nuclei, the rate of formation of nuclei and the rate of crystallization. Therefore, it is not possible to specify a heat treatment schedule that will be common to all the glasses of the invention.

However, it is usually preferred that the first-mentioned low temperature heat treatment of these Petticrew glasses be in a range of temperatures which promotes a high rate of formation of nuclei or crystallites, wherein "nuclei" are defined as submicroscopic precursors of crystalline species or as a finely dispersed submicroscopic immiscible glassy phase. The "high rate" of nuclei formation employed in a given instance is not necessarily the highest absolute rate of nuclei formation, but, nevertheless, the initial "nuclei-forming" heat treatment temperature is chosen so that the rate of nuclei formation is high relative to the rate of crystal growth at the chosen temperature. The mechanism of crystal initiation for the present glasses is not definitely known, nor is it known whether the first phase that separates during the crystallization heat treatment schedule is an immiscible glassy phase or is separate crystallite or crystalline phase, Also, it is difficult to measure directly the range of temperatures in which the high rates of nuclei formation occur, or in other words, where the optimum temperature range for the initial heat treatment is to be located. However, this temperature range usually is in the range from 30° F. below the annealing point of the glass to 250° or 300° F. above the annealing point. The annealing point, as defined herein, can be determined by ASTM designation C 336–54T, with the testing apparatus being calibrated using fibers of standard glasses having known annealing and strain points as specified and published by the National Bureau of Standards.

The process of the invention of this Petticrew patent application usually comprises heat treating the formed article in an optimum initial temperature range between 30° F. below the annealing point and about 250° F. or 300° F. above the annealing point for a time of at least one-half hour, usually at least one hour, and thereafter heat treating in a higher crystallization temperature range. Where deformation or slumping is a problem, it is usually necessary that the initial heat treatment include at least a one-half hour period at a temperature not over about 175 to 200° F. above the annealing point temperature. The time of initial heat treatment in the range from 30° F. below to 300° F. above the annealing point has no upper limit; usually it is not more than 5 or 6 hours, but longer times are not usually in the least harmful. In fact, in heat treating thick articles it is often advantageous to use very long times up to a day or a week or more at the lower temperatures in this range, in order to obtain more uniform treatment throughout the thickness of the article.

The crystallization heat treatment stage in this process of Petticrew is effected at higher temperatures, usually in the range from about 1500–2000° F. with a sufficient length of time of heating in the high temperature range to effect in situ crystallization to at least the extent that the resulting glass-ceramic product, after cooling to room temperature and reheating, will not substantially deform under its own weight when held for one hour at a temperature 300° F. above the annealing point of the original glass. Thus, a rod, 5 inches long and ¼ inch in diameter supported near each end by knife edges spaced 4 inches apart will not deform or sag at the center under such conditions as much as ¼ inch. Obviously, a degree of crystallization that passes this test represents a rather highly crystalline material, since glass or glass with only around 5% crystalline material would obviously deform badly when held at a temperature so far above its annealing point. However, it is not possible to determine the exact relative amounts of crystalline and vitreous material in such densely crystallized materials as are produced by the present invention. Generally, times of heating in the temperature range of 1500 to 2000° F. are from 15 minutes to 6 hours, usually from ½ to 4 hours. Again, however, much longer times can be employed in lower temperature ranges to obtain very uniform crystallization.

In any event, the overall heat treatment chosen, that is, the initial or nucleation heat treatment and the crystallization heat treatment, effected at the higher temperature, results in an at least partially crystalline ceramic body whose entire interior contains a multitude of randomly oriented, substantially homogeneously dispersed crystals, essentially all of which crystals are in their largest lineal dimension less than 30 microns across. The products are densely crystallized, hard, and non-porous.

As will be understood, when going from the initial or nucleation heat treatment temperature to the higher crystallization temperature, it is usually preferred to proceed slowly enough, or to stop at intermediate plateaus long enough, to effect appreciable crystallization in the intermediate temperature range, at least to such a degree that a sufficiently rigid crystalline network is formed that prevents the article from slumping. Of course, in heat treating articles such as flat plates that can be cast in a mold and heat treated in the mold, the slumping problem is not important and not as much care need be exercised.

Although the specific examples shown in Table I of this Petticrew patent application show several plateaus of heat treatment temperatures, the entire heat treatment can be effected using slowly and continuously rising temperatures, and it is often desirable to employ different heating rates at various stages of the heating process. For instance, in the nucleation heat treatment temperature range the heating rate is usually slower than when going from this lower temperature range to the final crystallization temperature range.

It is an object of the present invention to provide a process of treating a glass to form a glass-ceramic and then ion-exchanging the latter to provide an article having a high flexural strength, especially a high flexural strength after subjecting such ion-exchanged glass-ceramic to a severe abrasion.

It is a further object of this invention to provide a process of treating a glass to form a glass-ceramic and ion-exchanging the latter to obtain an article of glass-ceramic having, after severe abrasion, a flexural strength that is greater than the flexural strength, after mild abrasion, of untreated glass-ceramic of the same general class of composition.

It is another object of the present invention to provide a process of increasing the flexural strength of an article of glass-ceramic having an average coefficient of linear thermal expansion that is greater than $30 \times 10^{-7}/°$ C. over the range of temperature from 25° C. to 300° C., and that has a compressive stress surface layer of glass-ceramic and a main body of glass-ceramic having the same overall composition as that of the glass-ceramic surface layer and in which the overall composition of the glass-ceramic of the surface layer and the main body of the article contains $SiO_2$, $Al_2O_3$, $Li_2O$, and alkaline earth metal oxide selected from MgO and CaO, an alkali metal oxide chosen from $Na_2O$ and $K_2O$ and a nucleant selected from $TiO_2$ and $ZrO_2$.

Still another object of the invention is to provide an article having a high flexural strength even after severe abrasion and having a surface layer of glass-ceramic and a main body that is glass-ceramic with the overall composition of the surface layer having a lower content of alkali metal than that of the same alkali metal in the main body and having a higher content of different alkali metal of larger ionic radius than the content of this different alkali metal in the main body of the glass-ceramic article.

These and other objects of the present invention will be apparent to one of ordinary skill in the art from a description of the invention that follows.

The process of the present invention comprises (1) treating an article of glass at elevated temperatures and for periods of time at such temperatures to provide an article of glass-ceramic that has a compressive stress surface layer of glass-ceramic and a main body portion of glass-ceramic with the surface layer and the main body having essentially the same overall composition, with the maximum temperature of treatment being about 1650° F. and (2) subjecting the glass-ceramic article to an ion-exchange treatment to exchange alkali metal ions in at least the outer portion of the compressive stress surface layer of the article with larger alkali metal ions at an elevated temperature and for a period of time to obtain by such ion-exchange an ion-exchanged glass-ceramic article.

The glass used in this process of the invention has a composition such that it contains only a limited amount of $Li_2O$ content or concentration, so that the first recited step, which provides an in situ crystallization, produces a partially crystalline glass-ceramic in which the surface layer has a compressive stress. This glass composition is also composed so that the partial crystallization produces a glass-ceramic that has an average coefficient of linear thermal expansion, over the range from 25° C. to 300° C., that is greater than $30 \times 10^{-7}/°$ C. and that preferably is at least $40 \times 10^{-7}/°$ C.

In these glasses used in the process of the present invention the total of the weight percent of $SiO_2$, $Al_2O_3$, $Li_2O$, said alkaline earth metal oxide and said nucleant comprise at least 90% of the glass composition. The glass is a broader composition than the composition used in the invention of the Petticrew U.S. patent application Ser. No. 410,016. The preferred glass composition contains on a weight basis 60% to 74% $SiO_2$, 13% to 17% $Al_2O_3$, 1.5% to 2% $Li_2O$, 6% to 13% alkaline earth metal oxide chosen from CaO and MgO, 2% to 8% nucleant, e.g., chosen from $TiO_2$ and $ZrO_2$ and 2.5% to 6% alkali metal oxide chosen from $Na_2O$ and $K_2O$. Also, the total of $Li_2O$ and $TiO_2$ is between 3% and 9% by weight of the composition. In the case of the nucleant the maximum weight percent of $TiO_2$ is 7% while the maximum amount of $ZrO_2$ is 2%.

In these preferred glass compositions MgO and CaO are both present, each in a concentration of between 2% and 7% by weight. In the case of the alkali metal oxide chosen from $Na_2O$ and $K_2O$, the preferred glasses contain only $Na_2O$ that can be present up to the maximum of 6% by weight indicated above for such alkali metal oxide. However, when $K_2O$ is present, it preferably should not exceed 4% by weight of the composition of the glass.

While 1.5 to 2% $Li_2O$ is present in the preferred compositions, less than 1.5% $Li_2O$ can be used in glasses utilized in the present process. Sufficient $Li_2O$ is present to provide the partial crystallization with creation of some compressive stress in a surface layer, but the very high increase of flexural strengths obtained by Petticrew through the partial crystallization is not required. There may be only a modest increase in flexural strength so that the partially crystallized article has an uabraded flexural strength of at least twice that of the thermally crystallizable glass used, e.g., of at least 20,000 p.s.i. Such strength increase, to the extent that it is retained during ion-exchange, can cooperate with that provided by the ion-exchange so that the final article has high unabraded and abraded flexural strengths.

In these partially crystallizable glass compositions used in the present invention, small amounts of other compatible glass-forming components, such as inorganic oxides and halides, can be included: e.g., up to about 3% BaO or SrO, up to about 4% $B_2O_3$ or $P_2O_5$, up to 1% ZnO or F (of course, F is present in combined form as a fluoride), and small amounts of colorants, such as NiO, CoO, etc.

Within the compositional area defined by the foregoing description, the glasses that are used are such that the heat treatment at the maximum temperature of about 1650° C. produces compressive stress surface layer in the glass-ceramic article thus formed. The choice of suitable percentages of the various ingredients is easily determined even for the preferred compositions stated above and the especially preferred composition that is described and claimed in the Petticrew U.S. patent application mentioned above in connection with the invention of Petticrew. The simple experimentation will determine those specific compositions that by such heat treatment result in a crystallization to produce a glass-ceramic article having the compressive stress surface layer of glass-ceramic and the other properties to be obtained in the first step of the process of the present invention as recited above.

It is preferred that all of the alkali metal oxide concentration, other than $Li_2O$ concentration, in these glasses that are partly crystallized, be entirely $Na_2O$ rather than $K_2O$ or a mixture of $Na_2O$ and $K_2O$.

In the second recited step of the process of the present invention the ion-exchange treatment uses a conventional ion-exchange medium, i.e., a material that has been useful in exchanging larger alkali metal ions for small alkali metal ions in glasses. In the preferred process in which $Na_2O$ is the only alkali metal oxide other than $Li_2O$, the preferred ion-exchange medium contains a sufficient concentration of a salt of potassium. Of course, when $K_2O$ constitutes the predominant or entire concentration of alkali oxide other than $Li_2O$, the ion-exchange medium contains a salt of alkali metal ion having a larger ionic radius than potassium ion, e.g., cesium ions.

In the ion-exchange treatment, that is the second recited step of the process of the invention, as described above, alkali metal ions in at least the outer portion of the compressive stress surface layer of the glass-ceramic article obtained by the first recited step are replaced by alkali metal ions having a larger ionic radius. This type of ion-exchange where glass is the material that is being ion-exchanged is a process that has been described by S. S. Kistler in a paper in the Journal of the American Ceramic Society, 45, No. 2, at pages 59–68, and by Research Corportion in British Pat. No. 917,388. In the Kistler process molten salts are placed in contact with the glass to provide the ion exchange. These are salts of alkali metal and inorganic acids.

In the ion-exchange treatment of the process of the present invention, the elevated temperature is below that temperature at which the strain introduced by the substitution of the larger alkali metal ion is released to any substantial extent during the time of the ion-exchange treatment. This elevated temperature is at least about 200° C. and preferably is at least 300° C. The ion-exchange is performed for a period of time and at a temperature sufficient to substitute the larger alkali metal ions to a depth adequate to provide a high degree of retention of the higher flexural strength obtained as a result of this ion exchange treatment of such strong, from the flexural strength standpoint, glass-ceramic. It is a feature of this present invention that this depth need not be as great, for retention of the increased strength after severe abrasion, as would be necessary with a glass to obtain a similar strength retaining property. Since increased ion-exchange depth is obtained at a given temperature by means of longer treatment time, and extending treatment time undesirably increases the cost of producing an article, this feature can be economically quite advantageous.

In another embodiment of the process of the present invention an article of glass-ceramic of a certain type has its flexural strength increased by an ion-exchange in which one alkali metal ion is replaced, in at least the outer portion of the compressive stress surface layer of the article, by a larger alkali metal ion in a conventional ion-exchange treatment using a medium that contains a salt of the larger alkali metal. This embodiment is the second step of the process of the first embodiment. It assumes that this certain type of glass-ceramic article is already in existence. As seen below in the example of the present invention, such required type of glass-ceramic can be one that is within the scope of the invention of the Petticrew U.S. patent application mentioned above, although the specific glass-ceramic of the present example is not disclosed in that patent application.

In this second embodiment the glass-ceramic article that is ion-exchanged has the overall composition and physical characteristics obtained by the heat treatment which is the first step of the first embodiment. These physical characteristics include a compressive stress surface layer of glass-ceramic and a main body of glass-ceramic of essentially the same overall composition as that of the surface layer. However, in this second embodiment it is immaterial how this starting glass-ceramic article was made. It may be by such heat treatment or any other process that provides the glass-ceramic article with such composition and such physical characteristics that by the ion-exchange process there can be obtained the ion-exchanged glass-ceramic article having a high value for abraded flexural strength while also having the other physical properties and compositional requirements recited earlier. The conditions of the ion-exchange treatment are those set forth in the description of the ion-exchange step of the first embodiment.

The article of the present invention has an overall composition as set forth above with respect to the glass or glass-ceramic used in the process embodiments, except for its alkali metal oxide content as set forth below. Its main body is a glass-ceramic. This article has a surface layer with at least a compressive stress outer surface portion. The main body has the overall composition of the glass or glass-ceramic used in the process embodiments and contains ions of lithium and sodium or potassium or both. The outer surface portion of the article has a less, i.e., smaller, molar percent or concentration of at least one of said lithium ions and ions of said sodium and/or said potassium but has substantially equivalent higher molar percent of alkali metal ion that is larger than such alkali metal ion, lithium and/or sodium and/or potassium, having said less concentration.

EXAMPLE

A mixture of the following batch materials was melted in a platinum crucible within a gas-fired furnace using slightly oxidizing conditions. The maximum temperature was about 2900° F. The overall time of melting the glass and fining it was about 70 hours. After the batch materials had melted and reacted to form the glass, the latter was mechanically stirred until adequate fining of the glass was achieved.

| Batch materials: | Parts by weight |
| --- | --- |
| Petalite [1] | 1716 |
| Ottawa flint [2] | 2166 |
| Alco A–10 alumina [3] | 474 |
| Periclase [4] | 98 |
| Florida zircon [5] | 75 |
| Titanox [6] | 100 |
| Sodium carbonate | 256 |
| Raw dolomite [7] | 492 |
| Lithium fluoride [8] | 14 |

[1] 4.2% $Li_2O$, 16.2% $Al_2O_3$, 77.7% $SiO_2$, 0.4% $Na_2O$, 0.2% $K_2O$ and 0.027% $Fe_2O_3$, and other minor impurities, including 1% ignition loss.
[2] 99.9+% $SiO_2$.
[3] 99.5% $Al_2O_3$, 0.03% $Fe_2O_3$, 0.1% $Na_2O$, 0.08% $SiO_2$, 0.2% ignition loss at 900° C.
[4] 95.3% $MgO$, 0.15% $Fe_2O_3$, 2.8% $SiO_2$, 0.3% $Al_2O_3$, 1.1% $CaO$.
[5] 66% $ZrO_2$, 33.5% $SiO_2$, 0.25% $TiO_2$, 0.1% $Fe_2O_3$.
[6] Substantially pure $TiO_2$.
[7] 21.34% $MgO$, 30.48% $CaO$, 0.3% $SiO_2$, 0.1% $Al_2O_3$ and 0.06% $Fe_2O_3$.
[8] Substantially pure LiF, except about 1% ignition loss.

The glass was cooled to a suitable temperature at which it has the desired viscosity to draw or pull a number of canes. The glass of these canes had the following composition on a weight basis, based on chemical analyses.

| Ingredient: | Percent by weight |
| --- | --- |
| $SiO_2$ | 70.20 |
| $Al_2O_3$ | 15.11 |
| $MgO$ | 3.93 |
| $CaO$ | 3.12 |
| $Li_2O$ | 1.62 |
| $TiO_2$ | 2.02 |
| $ZrO_2$ | 1.02 |
| $Na_2O$ | 3.04 |
| $F_2$ | 0.06 |
| $O_2$ equiv. to $F_2$ | −0.03 |
| Total | 100.09 |

As expected, a portion of the fluorine charged was lost by volatilization.

This glass had a liquids temperature of 2240° F. and an annealing point of 1225° F. The average coefficient of linear thermal expansion of this glass was between about $40 \times 10^{-7}/°$ C. and $50 \times 10^{-7}/°$ C. for the temperature range of 25° C. to 300° C.

The drawn cane of this glass was cooled slowly to room temperature. After their annealing the sample canes, having an average diameter of 0.200±0.005 inch, were cut into 5-inch lengths to make sample rods.

Some of these glass rods were subjected to heat treatments in an electric furnace for an in situ crystallization that do not follow that treatment required by the present invention but were of the type revealed in the abovementioned Petticrow U.S. patent application. These several heat treatments utilized a final heat treatment step of holding the rods at 1750° F. for one hour. The sets of rods, after heat treatment, were subjected to the standard mild abrasion treatment as described before and their flexural strengths, expressed as moduli of rupture, were determined as will be described later. The rods were greatly strengthened by the heat treatments, their average moduli of rupture ranging from 34,400 p.s.i. to 46,700 p.s.i. One heat treatment was selected from these as typical, because it gave rods having an average modulus of rupture of 40,900 p.s.i. This particular heat treatment was 1300° F. for 2 hours, 1500° F. for 2 hours and 1750° F. for one hour. Microscopic examination of one of these rods, subjected to this heat treatment, revealed that it contained crystals and had a surface layer about 17 microns thick, exhibiting a pronounced compressive stress.

Then three additional groups of these sample rods were subjected to heat treatments. The first group was subjected to the heat treatment described above which is not required by the present invention; namely, 1300° F. for 2 hours, 1500° F. for 2 hours, and 1750° F. for one hour. The second and third groups of sample rods were subjected to heat treatments of the present invention, for crystallization. These heat treatments were 1300° F. for 2 hours, 1500° F. for 2 hours, and 1650° F. for one hour for the second group of rods and 1300° F. for 2 hours, 1500° F. for 2 hours, and 1550° F. for one hour for the third group of rods. It can be seen that the first two portions of the heat treatments were the same for all three groups of rods treated. In all cases the rods were slowly cooled to room temperature by shutting off the electric power used to heat the furnaces for the heat treatment of the rods. Microscopic examination of one of each group of these sample rods revealed that all possessed a surface layer, ranging in depth from about 12 to about 20 microns and exhibiting a pronounced compressive stress.

All of these crystallized glass sample rods were subjected to an ion-exchange by immersion in a molten bath of potassium nitrate for 3 hours at 400° C. The rods were removed from the molten bath and, to avoid thermal tempering, were cooled freely in air at room temperature. The cooled rods, after washing with water to remove an adherent coating of potassium nitrate, were dried. The rods were severely abraded by tumbling for 15 minutes in a ball mill containing No. 30 silicon carbide grit. These abraded rods were tested for their flexural strength. A number, or group, of rods that were similarly treated, were tested to provide an average value of abraded flexural strength. Microscopic examination of one rod from each group again revealed that all still possessed surface layers, ranging in depth from about 12 to about 20 microns and exhibiting pronounced compressive stresses.

In the case of ion-exchange treatment of glass to improve its strength, it has been determined that such severe abrasion using this No. 30 carbide grit will substantially reduce or eliminate the increase of flexural strength afforded by ion exchange unless the abrasive stress surface layer created by the ion-exchange treatment has a depth of at least 50 microns. In fact, when the glass referred to in this particular example, in its non-heat treated form, i.e., before crystallization, is ion exchanged as described above, a surface depth of only two or three microns is obtained, certainly too shallow to retain strength after severe abrasion.

The ion-exchanged glass-ceramic rods from the heat treatment having the maximum temperature of 1750° F. had an average abraded flexural strength of only 19,500 p.s.i. Those sets of rods that had been heat treated with the maximum temperatures of 1550° F. and 1650° F. had average abraded flexural strengths of 75,800 p.s.i. and of 47,200 p.s.i. A comparison of these flexural strength values show the marked improvement in retention of flexural strength after abrasion as a result of having a maximum temperature of the heat treatment up to about 1650° F.

The flexural strengths or modulus of rupture values were determined using a Tinius-Olsen testing machine. This machine applies a measured load through a single knife edge to the center of the sample rod supported on two knife edges (3-point loading). The load is applied at a constant rate of 24 pounds per minute until failure occurs, with a marker indicating the highest load applied to the point of failure. A dial micrometer calibrated in inches and equipped with a bar contact instead of a point contact is used to measure the maximum and minimum diameters at the center of the sample to an accuracy of 0.001 inch. Since few cane samples are perfectly round, the load is applied normal to the maximum diameter and the standard formula for an elliptical cross-section is used in calculating the modulus of rupture (MR) as follows:

$$MR = \frac{\text{Load (lbs.)} \times 8 \times \text{span (in.)}}{(D_1^2 \times D_2)\pi}$$

The modulus of rupture in this formula gives the flexural strength in pounds per square inch of cross sectional area at failure.

The severe abrasion treatment described above provides a greater loss in flexural strength than would occur in the normal use of ion-exchanged glass-ceramic articles of commerce, e.g., bottles, tableware, etc. However, the foregoing results indicate the substantial improvement obtained in the manufacture of glass-ceramic articles by the process of the invention which includes the foregoing limitations with regard to the maximum temperature utilized in the final heat treatment for the in situ crystallization.

In the foregoing example the glass used has a composition within the class of compositions utilized in the invention of the Petticrew U.S. patent application mentioned above. In the ion-exchange treatment of the example, potassium ions are substituted for smaller alkali metal ions.

The foregoing description of the present invention has referred to various copending U.S. patent applications having common assignee. Their disclosures are hereby incorporated by reference.

The article of the present invention is better understood with reference to the various embodiments of the process, although the article is not restricted to the particular method of making it that is described above.

Various terms, including "strain point" and "annealing point" have been used in this description. The definitions of these terms are well-known in the art and in the published literature.

The article of the present invention has many forms of utilization such as bottles, tableware, flat glass, etc. In view of the fact that such articles can be made by the process of the invention in which the initial article is glass, obviously such article can take many different forms in which glass can be processed by using conventional forming, drawing or other shaping operations.

In view of the foregoing example and description of various embodiments of the present invention as a process and as an article of manufacture, various modifications of the present invention will be apparent to one of ordinary skill in the art. The example and amplified description are presented merely for an illustration of the invention and not by way of limitation of the invention, which is limited only by the claims that follow.

I claim:

1. A process of treating an article of glass to provide a glass-ceramic having a high flexural strength which comprises:
   (1) heat treating an article of glass at elevated temperatures, including a nucleation temperature and a subsequent higher temperature that is a maximum of about 1650° F., for periods of time at said temperatures and for a period of time for any temperature intermediate said nucleation temperature and said subsequent maximum temperature, sufficient to provide a glass-ceramic article having an average coefficient of linear thermal expansion of greater than $30 \times 10^{-7}/°$ C. for the range of 25° C. to 300° C. with a main body of glass-ceramic and a compressive stress surface layer of glass-ceramic of the same overall composition as that of the main body,
said glass containing in a weight basis:
60 to 70% $SiO_2$
13 to 17% $Al_2O_3$
1.5 to 2% $Li_2O$
6 to 13% alkaline earth metal oxide
2.5 to 6% alkali metal oxide
2 to 8% nucleant wherein the alkaline earth metal oxide is selected from the group consisting of MgO and CaO, alkali metal oxide is selected from the group consisting of $Na_2O$ and $K_2O$, and the nucleant is selected the group consisting of $TiO_2$ and $ZrO_2$, said $SiO_2$, $Al_2O_3$, said alkaline earth metal oxide and said nucleant constituting at least 90% by weight of the glass composition, said $Li_2O$ constituting a maximum of 2% by weight of said glass and the maximum weight percent of $TiO_2$ in said glass is 7% and the maximum weight percent of $ZrO_2$ in said glass is 2%, and (2) treating the article of glass-ceramic with an ion-exchange medium containing a salt of alkali metal other than lithium at an elevated temperature of at least 200° C. and for a period of time to exchange ions of said alkali metal of said salt of the ion-exchange medium for ions of at least one of said $Li_2O$ and said alkali metal oxide in the surface layer only of the glass-ceramic article, with such ion exchange being at least in an outer portion of the surface layer, said elevated temperature being below that at which compressive stress created by said ion exchange is relieved, so as to produce an ion-exchanged glass-ceramic article that has said outer portion of the surface layer with a compressive stress and with an overall composition on a molar percent basis substantially identical to that of the glass-ceramic of the main body, except that on a molar basis (a) the molar percent of at least one of said $Li_2O$ and said alkali metal oxide selected from the group consisting of $Na_2O$ and $K_2O$ is less in the outer portion of the surface layer of said ion-exchanged glass-ceramic article than the molar percent in the main body of the ion-exchanged glass-ceramic article, and (b) said outer portion of the surface layer of said ion-exchanged glass-ceramic article contains an oxide of said alkali metal of said salt of the ion-exchange medium in a higher molar percent than in said main body of the article by a difference that is substantially equal to the difference by which the molar percent of at least one of said $Li_2O$ and said alkali metal oxide is less in said compressive stress outer portion of surface layer of the ion-exchange glass-ceramic as compared with the molar percent in the main body of the ion-exchange glass-ceramic article.

2. A process of improving the flexural strength of a glass ceramic article having an average coefficient of linear thermal expansion of greater than $30 \times 10^{-7}/°$ C. for the range 25° C. to 300° C. with the main body of glass-ceramic and a compressive stress surface layer of glass-ceramic of the same overall composition as that of the main body, said glass ceramic having a crystalline phase containing $Li_2O$, $Al_2O_3$ and $SiO_2$, said overall composition of said glass ceramic containing
60 to 70% $SiO_2$
13 to 17% $Al_2O_3$
1.5 to 2% $Li_2O$
6 to 13% alkaline earth metal oxide
2.5 to 6% alkali metal oxide
2 to 8% nucleant
and wherein the alkaline earth metal oxide is selected from the group consisting of MgO and CaO, the alkali metal oxide is selected from the group consisting of $Na_2O$ and $K_2O$ and the nucleant is selected from the group consisting of $TiO_2$ and $ZrO_2$, and said $SiO_2$, $Al_2O_3$, alkaline earth metal oxide, and nucleant constituting at least 90% by weight of the glass ceramic overall composition, and said $Li_2O$ constituting a maximum 2% by weight of said composition of glass ceramic, and wherein the glass ceramic is made by thermal heat treatment including a maximum temperature of about 1650° F. which comprises:

treating said article of glass ceramic with an ion exchange medium containing a salt of alkali metal other than lithium at an elevated temperature of at least 200° C. and for a period of time to exchange alkali metal ions of said salt of the ion exchange medium with ions of alkali metal, that are smaller than said alkali metal ions of said salt, in the surface layer only of the glass ceramic article with such ion exchange being in at least an outer portion of the surface layer, said elevated temperature being below that at which compressive stress created by said ion exchange is relieved, so as to produce an ion exchange glass ceramic article that has (1) said outer portion of the surface layer with a compressive stress and with an overall composition on a molar percent basis substantially identical to that of the glass-ceramic of the main body except that on a molar basis (a) the molar percent of at least one of said $Li_2O$ and said alkali metal oxide selected from the group consisting of $Na_2O$ and $K_2O$ is less in said outer surface portion than the molar percent in the main body of the ion-exchanged glass-ceramic article, and (b) said outer portion of the surface layer of said ion-exchanged glass-ceramic article contains an oxide of said alkali metal of said salt of the ion-exchange medium in a higher molar percent than in said main body of the article by a difference that is substantially equal to the difference by which the molar percent of at least one of said $Li_2O$ and said alkali metal oxide is less in said compressive stress outer portion of surface layer of the ion-exchange glass-ceramic as compared with the molar percent in the main body of the ion-exchange glass-ceramic article, and (2) an abraded flexural strength of at least 40,000 p.s.i. as determined by subjecting sample rods of the initial glass-ceramic to a tumbling abrasion with No. 30 silicon carbide grit after such ion-exchange treatment and prior to strength testing.

3. The process of claim 1 wherein on a weight basis said glass contains 1% to 7% $TiO_2$, 0% to 2% $ZrO_2$, 0% to 6% $Na_2O$ and 0% to 4% $K_2O$, and the sum of $Li_2O$ and $TiO_2$ is 3% to 9%, the sum of $TiO_2$ and $ZrO_2$ is 2% to 8% and the sum of $Na_2O$ and $K_2O$ is 2.5% to 6%.

4. The process of claim 3 wherein said alkali metal oxide in said glass is entirely $Na_2O$ and said alkaline earth metal oxide in said glass is a mixture of MgO and CaO.

5. The process of claim 4 wherein on a weight basis said glass contains 2% to 7% MgO and 2% to 7% CaO.

6. The process of claim 5 wherein said glass has a composition such that by said heat treating to form a glass-ceramic, the glass-ceramic has a body with an average coefficient of linear thermal expansion of at least $40 \times 10^{-7}/°$ C. for said range.

7. The process of claim 6 wherein the ion-exchange medium contains a salt of potassium and said elevated temperature for said ion-exchange treatment is below the strain point of said glass.

8. The process of claim 7 wherein the ion-exchange treatment is at a temperature of at least 300° C. and the ion exchange medium is potassium nitrate.

9. The process of claim 8 wherein
(1) the glass contains, on an approximate weight basis, 70% $SiO_2$, 15% $Al_2O_3$, 4% MgO, 3% CaO, 1.6% $Li_2O$, 2% $TiO_2$, 1% $ZrO_2$ and 3% $Na_2O$,
(2) the heat treatment to form the glass-ceramic is at 1300° F. for 2 hours to provide nucleation, 1500° F. for 2 hours and 1650° F. for 1 hour,
(3) the ion-exchange treatment of the glass-ceramic article is by immersion in potassium nitrate at 400° C. for 3 hours.

10. The process of claim 8 wherein
(1) the glass contains, on an approximate weight basis, 70% $SiO_2$, 15% $Al_2O_3$, 4% MgO, 3% CaO, 1.6% $Li_2O$, 2% $TiO_2$, 1% $ZrO_2$ and 3% $Na_2O$,
(2) the heat treatment to form the glass-ceramic is at 1300° F. for 2 hours to provide nucleation, 1500° F. for 2 hours and 1550° F. for 1 hour,
(3) the ion-exchange treatment of the glass-ceramic article is by immersion in potassium nitrate at 400° C. for 3 hours.

11. The process of claim 2 wherein, on a weight basis, said overall composition of the initial glass-ceramic contains 2% to 7% MgO, 2% to 7% CaO, 1% to 7% $TiO_2$, 0% to 2% $ZrO_2$, 0% to 6% $Na_2O$ and 0% to 4% $K_2O$, and the sum of $Li_2O$ and $TiO_2$ is 3% to 9%, the sum of $TiO_2$ and $ZrO_2$ is 2% to 8% and the sum of $Na_2O$ and $K_2O$ is 2.5% to 6%.

12. The process of claim 11 wherein
(1) on an approximate weight basis said overall composition of the initial glass-ceramic contains 70% $SiO_2$, 15% $Al_2O_3$, 4% MgO, 3% CaO, 1.6% $Li_2O$, 2% $TiO_2$, 1% $ZrO_2$ and 3% $Na_2O$,
(2) said ion-exchange medium is potassium nitrate,
(3) said treatment with the ion-exchange medium is for 3 hours at 400° C., and
(4) said abraded strength is at least 75,000 p.s.i.

13. An article comprising a main body of glass-ceramic and an integral surface layer of glass-ceramic, having at least an outer portion of the surface layer with compressive stress and produced by the process as set forth in claim 1.

References Cited

UNITED STATES PATENTS

| | | | |
|---|---|---|---|
| 2,920,971 | 1/1960 | Stookey | 65—33X |
| 3,113,009 | 12/1963 | Brown et al. | 65—33 |
| 3,170,805 | 2/1965 | McMillan et al. | 65—33X |
| 3,287,200 | 11/1966 | Hess et al. | 65—30X |
| 3,428,513 | 2/1969 | Denman | 65—33X |

FOREIGN PATENTS

| | | | |
|---|---|---|---|
| 2,352 | 2/1962 | Republic of South Africa | 65—30 |

OTHER REFERENCES

B. R. Karstetter and R. O. Voss, "Chemical Strengthening of Glass Ceramics in the $Li_2O$-$Al_2O_3$-$SiO_2$ System," paper presented at the Am. Cer. Soc. Meeting, Washington, D.C., May 1966, pp. 1–14, Tables 1, 3, 4, drawing.

S. LEON BASHORE, Primary Examiner

J. H. HARMAN, Assistant Examiner

U.S. Cl. X.R.

65—33; 106—39DV; 161—1